United States Patent [19]

Young

[11] 4,108,759

[45] Aug. 22, 1978

[54] PROCESS AND APPARATUS FOR CONVERTING COAL INTO OIL AND OTHER COAL DERIVATIVES

[76] Inventor: Serenus H. A. Young, Apt. S-3, 1716 Terrell Mill Rd., Marietta, Ga. 30060

[21] Appl. No.: 591,614

[22] Filed: Jun. 30, 1975

[51] Int. Cl.$^2$ .................. C10G 1/08; B01G 11/02; B01J 1/12
[52] U.S. Cl. .................................. 208/10; 208/8; 23/252 B; 204/157.1 S; 204/158 S
[53] Field of Search ............... 208/8, 10; 204/157.1 S, 204/158 S, 193; 23/252 R, 252 B

[56] References Cited

U.S. PATENT DOCUMENTS

| | | | |
|---|---|---|---|
| 2,722,498 | 11/1955 | Morrell et al. | 208/8 |
| 3,503,865 | 3/1970 | Stone | 208/8 |
| 3,560,347 | 2/1971 | Knapp et al. | 208/8 |
| 3,577,337 | 5/1971 | Kessler et al. | 208/8 |

OTHER PUBLICATIONS

Fuel, vol. 49, 1970, pp. 222–223, "Ultrasonic Solvation of Coal", Kessler et al.
Bureau of Mines, 1948 annual report, #4456, Synthetic Liquid Fuels – Oil from Coal, pp. 31–36.

*Primary Examiner*—Delbert E. Gantz
*Assistant Examiner*—J. Thierstein
*Attorney, Agent, or Firm*—Frailey & Ratner

[57] ABSTRACT

Process and apparatus for the gasification and liquefaction of bituminous type coal to produce fuel oil, including gasoline, and other liquid coal derivatives. The process includes the steps of providing clean, finely pulverized coal, gasifying the pulverized coal to produce hydrogen, by mixing the coal particles with superheated steam in the presence of heat in the range of 1,800° to 2,000° F., in a closed, oxygen-free pressure vessel, separating the hydrogen produced and introducing it into a closed, oxygen-free, coal liquefaction pressure vessel, for admixture with a slurry composed of fine particulate coal and a hydrogenating liquid, and subjecting the mixture to heat, pressure and ultrasonic shock waves to produce liquid effluent consisting of oil and a hydrogenating fluid. The effluent may be subjected either to fractionation in a still, or to centrifugation, to separate its oil and hydrogenating fluid components. The invention includes a coal gasification reactor comprising a closed, heated, high pressure vessel which reduces the chemical reaction residence time to gasify the finely pulverized coal to milliseconds. It also includes a coal liquefaction reactor comprising a closed, heated, high pressure vessel which greatly accelerates liquefaction of the coal, while providing substantially greater yields of fractionable liquid fuels.

25 Claims, 4 Drawing Figures

PROCESS AND APPARATUS FOR CONVERTING COAL INTO OIL AND OTHER COAL DERIVATIVES

SUMMARY OF THE INVENTION

The primary object of this invention is to provide a new and improved process for converting coal to liquid coal derivatives, and particularly for converting bituminous type coal into fuel oil, gasoline and other useful liquid coal derivatives.

A further object of this invention is to provide a new and improved process for converting coal into oil and other liquid coal derivatives which greatly accelerates the liquefaction of the coal, by reducing substantially its chemical reaction residence time, while increasing substantially the yield of usable, fractionable oil per ton of coal.

A further object is to provide a new and improved process for converting coal into oil and other coal derivatives which includes both the gasification and liquefaction of coal, in which a first batch of finely pulverized coal is gasified in a first vessel to produce hydrogen and other coal by-products and a second batch of finely pulverized coal is liquefied in a second vessel into which the hydrogen produced from the gasification of the first batch of coal is continuously introduced.

A further object is to provide a new and improved process for the continuous gasification of coal which reduces to milliseconds the chemical reaction residence time to gasify the coal to produce coke and combustible volatile gases, such as hydrogen.

A further object is to provide a new and improved process for the continuous liquefaction of coal which comprises forming a slurry composed of finely pulverized coal particles and a hydrogenating liquid, locating the slurry in a closed, substantially oxygen-free pressure vessel and heating the slurry in the vessel, while continuously introducing hydrogen into the slurry and subjecting the slurry to ultrasonic shock waves emitted at frequencies approximating the relaxation frequencies of the components of the liquid effluent produced by the liquefaction process.

A further object is to provide new and improved apparatus for the gasification of coal which includes a closed, substantially oxygen-free pressure vessel, feeding means for introducing finely pulverized coal particles into the vessel, at a selected rate of feed, microwave radiators for heating the coal particles as they enter the vessel, means for exposing the heated coal particles to superheated steam in the vessel and means for continuously and separately removing the combustible volatile gases and finely divided coke which are produced.

A further object is to provide new and improved apparatus for the liquefaction of coal which includes means for producing a slurry composed of finely pulverized coal and a hydrogenated liquid, means for metering the slurry into a closed, substantially oxygen-free pressure vessel, means for heating the slurry in the vessel, means for continuously introducing hydrogen into the heated slurry and means for subjecting the heated slurry to ultrasonic shock waves, to accelerate the rate of liquefaction while increasing the yield of fractionable liquid fuels per ton of coal.

Other objects and advantages of this invention will be readily apparent from the following description of preferred embodiments thereof, reference being had to the accompanying drawing.

DETAILED DESCRIPTION OF THE INVENTION

Figure 1:
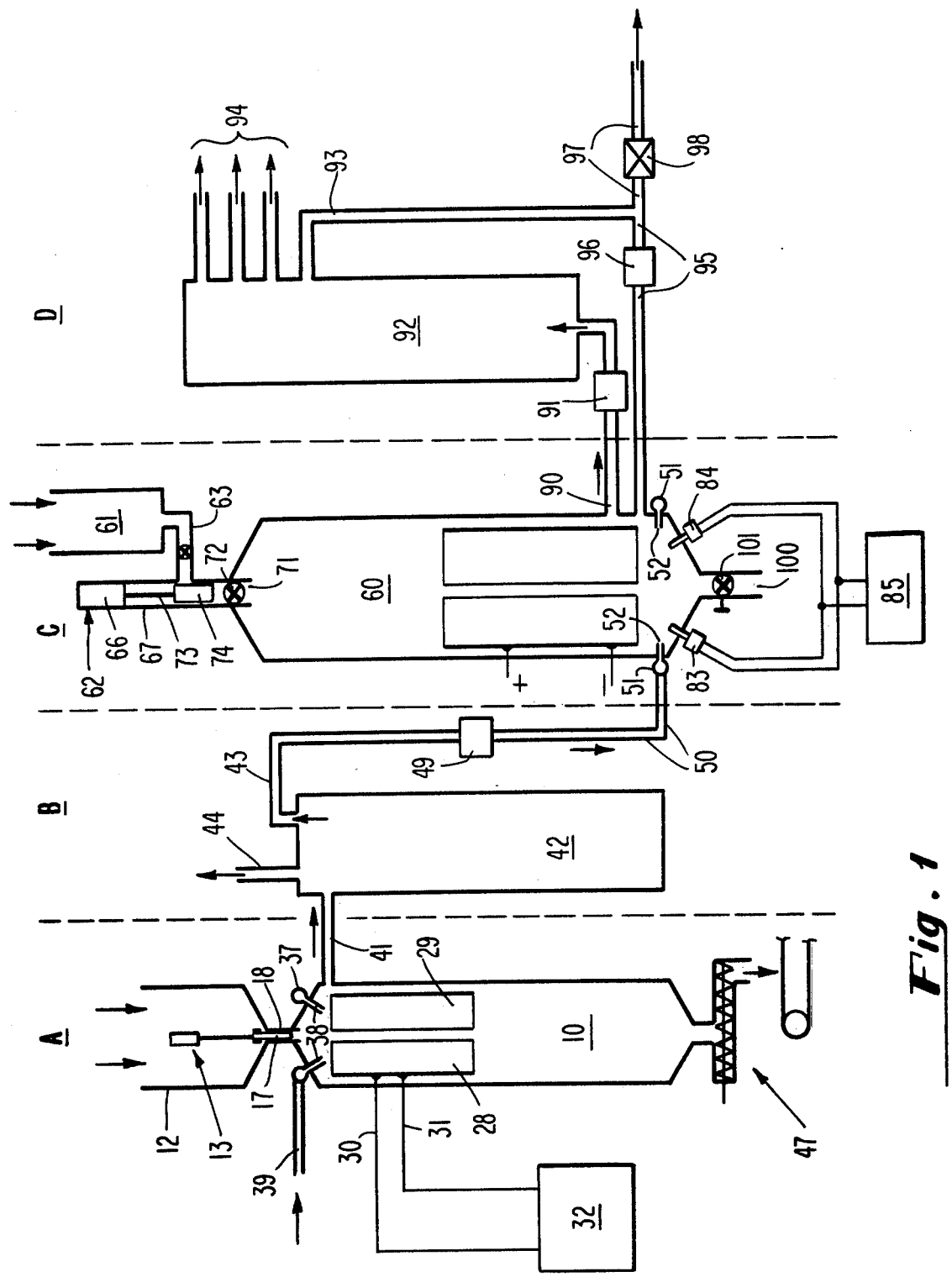
FIG. 1 is a schematic flow diagram in elevation illustrating a preferred embodiment of my invention.

FIG. 1 illustrates schematically a preferred process of this invention for the gasification and liquefaction of bituminous type coal for conversion into fractionable liquid fuels. Illustrated schematically in FIG. 1 are the four separate stages of the complete process made possible by this invention, for converting coal into liquid fuels and other liquid coal derivatives. Briefly, the letter "A" indicates the coal gasification phase of the process, the letter "B" indicates the hydrogen separation phase, where hydrogen is separated from the other gases produced by gasification of the coal, the letter "C" indicates the coal liquefaction phase of the process, where coal is converted to liquid effluent composed of oil and a hydrogenating liquid, and the letter "D" indicates the final, separation stage of the process where the various components of the liquid effluent may be separated.

Figure 2:
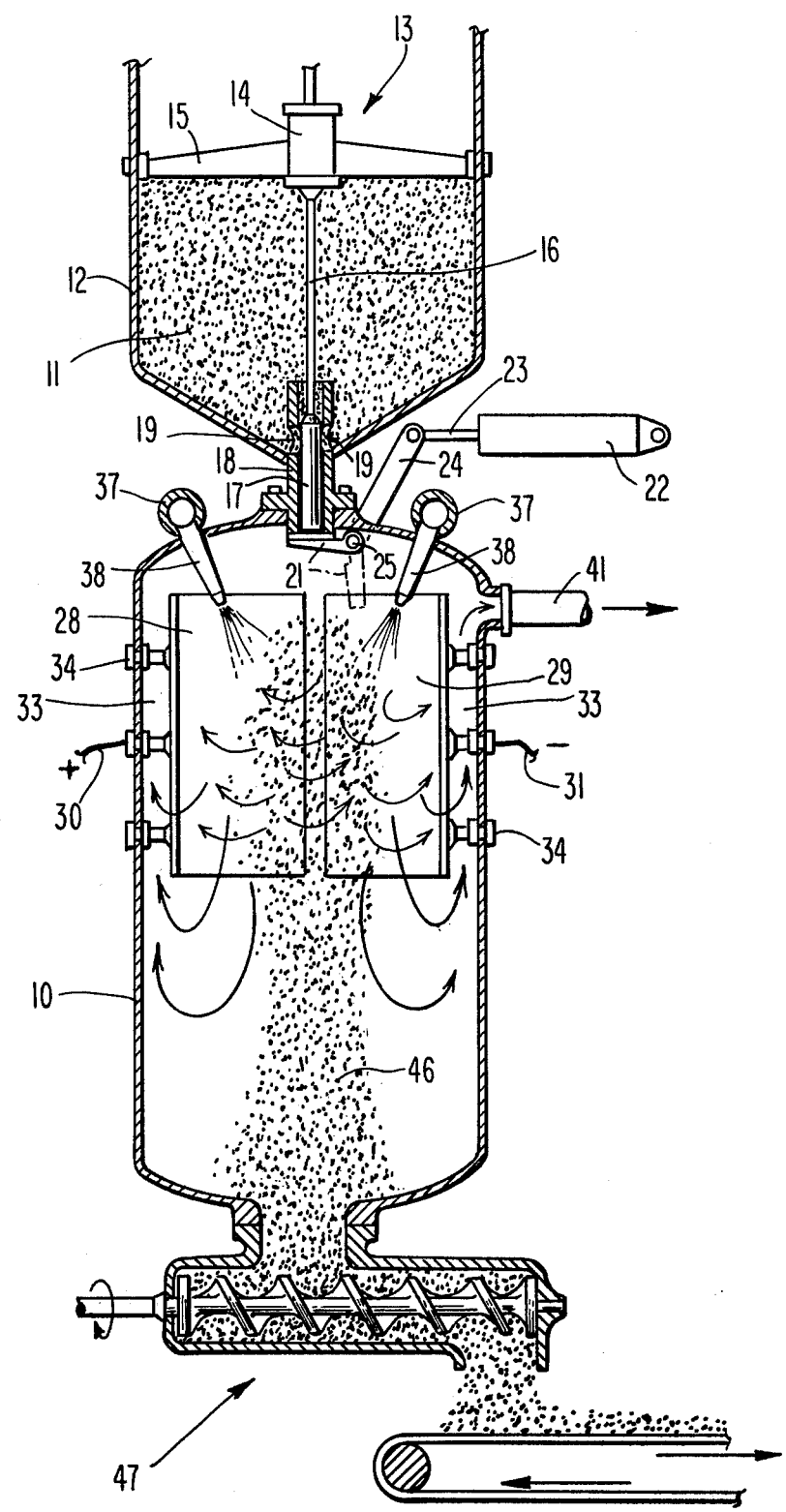
FIG. 2 is an enlarged view showing a preferred coal gasification apparatus utilized in my invention.

FIG. 2 illustrates in detail a preferred coal gasification apparatus which includes a closed, substantially oxygen-fre pressure vessel or reactor 10, a supply of finely pulverized coal 11 disposed externally of the vessel 10 in a bin or hopper 12 and a feeding device 13 for feeding the pulverized coal 11 from the bin 12 into the vessel 10 at any selected or metered feeding rate.

Preferably, the coal particles 11 in the bin 12 are substantially free of contaminants, such as pyrites, and of pollutants, such as organic sulphur, and have been reduced below 10 microns in size. The pulverized coal may be reduced by two stage pulverizing, by conventional reducing means, the coal first being reduced to the order of 200 to 300 mesh particles in the first mill, and then being further reduced to "microcoal" in a second mill, below 10 microns in size, and preferably in the range of 0.5 to 5 microns. Following its reduction, the pulverized coal is subjected to conventional processes for removal of its pyrites and sulphur content, and then deposited in the bin 12 preparatory to its gasification in vessel 10.

The coal feeding device 13 includes a solenoid-controlled pneumatic or hydraulic cylinder 14 mounted internally of bin 12 by a bracket 15. Extending vertically downward from the cylinder 14 is a reciprocal rod 16 provided with a piston or plunger 17 at its lower end. Interposed between the bottom of the coal bin 12 and the top of the vessel 10 is a hollow tube 18 which serves as a conduit for delivering metered quantities of pulverized coal 11 from bin 12 into the top of the vessel 10. The portion of the tube 18 disposed internally of bin 12 is provided with one or more lateral ports 19 through which particles of the coal 11 may flow into the tube en route to the vessel 10.

The plunger 17 is caused to reciprocate vertically within the tube or cylinder 18 by means of the upper cylinder 14. The outer cylindrical surface of the plunger 17 engages the inner circular wall of the cylinder 18 in a fluid-type relationship, to ensure the maintenance of a constant, selected superatmospheric pressure within the vessel 10.

The lower end of the cylinder 18 normally is closed by a flapper valve 21 mounted internally of the vessel 10 adjacent the top thereof. Valve 21 may be pivoted from its closed position, shown in solid lines in FIG. 2, to open position, shown in shadow lines in FIG. 2, by any suitable control means, such as a solenoid-controlled hydraulic or pneumatic cylinder 22 having a rod 23 connected to a lever 24 affixed to the external portion (not shown) of the rock shaft 25 to which flapper valve 21 is affixed. Rock shaft 25 extends through the wall of the vessel 10, and valve 21 is affixed to its internal portion, within the vessel.

The operation of the cylinders 14 and 22 is coordinated by any suitable timing means, to permit the introduction of pulverized particles of coal 11 into the vessel 10 at a selected metered rate. More particularly, with the flapper valve in closed position, as shown in FIG. 2, cylinder 14 causes plunger 17 to retract vertically upward, relative to the tube 18, to a location at which the bottom of the plunger is disposed above the ports 19 in the conduit 18. Fine particles of the coal 11 thereupon flow through the ports 19 into the conduit 18 until the conduit is filled with finely powdered coal. Thereupon, cylinder 14 is activated to advance the plunger 17 downward internally of the conduit 18 to begin to compress the pulverized coal therein. As soon as the plunger 17 has sealed off the ports 19 from communication with the interior of the conduit 18, cylinder 22 is actuated to advance rod 23 and lever 24 to cause valve 21 to open. The continued downward advance of plunger 17 discharges the coal particles in the cylinder 18 into the top of the vessel 10. As soon as the plunger 17 has completed its downward stroke, cylinder 22 again is activated to retract its rod 23, to cause valve 21 to pivot upwardly to close the lower end of the cylinder or conduit 18. After valve 21 has been closed, cylinder 14 retracts plunger 17 preparatory to feeding a fresh charge of pulverized coal into the vessel 10. Thus, the operation of the cylinders 14, 22 is coordinated to maintain the vessel 10 under constant, selected superatmospheric pressure at all times.

As the coal particles 11 drop vertically into the vessel 10, they are heated by microwave energy emanating from a pair of spaced, semicircular microwave radiators 28, 29 mounted internally of the vessel and connected electrically, by suitable electrical conduits 30, 31, to an external microwave generator 32 (FIG. 1). The microwave radiators 28, 29 are tuned in frequency and power level to heat only the coal particles 11 falling between them. The radiators preferably are operated to heat the descending coal particles in the range of 1,200° F. to 2,000° F.

The microwave radiators 28, 29 are spaced inwardly from the inside wall of the vessel 10, to provide therebetween a vertically extending, substantially annular space 33. The radiators 28, 29 are secured firmly in place internally of vessel 10 by suitable support means 34.

Mounted externally of the top of the vessel 10 is an annular manifold 37 provided with a series of arcuately spaced, downwardly inclined nozzles 38. Manifold 37 is connected by steam line 39 (FIG. 1) to a source of superheated steam (not shown). The circular series of steam nozzles 38 extend down through the top of the vessel 10, with their distal ends disposed adjacent the top of the microwave radiators 28, 29. The several depending nozzles 38 are all inclined radially inward, so as to spray superheated steam directly onto the heated coal particles 11, as they descend into the vessel 10. The high pressure superheated steam thoroughly intermixes with the heated coal particles 11. Since the interior of the vessel 10 is oxygen-free, the chemical reaction residence time between the steam ($H_2O$) and the microwave heated coal particles (C) to gasify the coal is reduced to milliseconds. The reaction between the steam and the carbon in the coal, known as "coking", produces coke and combustible volatile gases. The reaction between the superheated steam and the coal particles produces hydrogen in accordance with the following chemical equation:

$$C + H_2O \rightarrow H_2 + CO$$

The effluent gases resulting from the process move upwardly through the annular space or plenum 33, and are exhausted from vessel 10 through a discharge pipe 41 to a conventional gas separator 42 (FIG. 1). In the gas separator 42, the hydrogen produced as the result of the gasification of the coal in vessel 10 is separated from the other gases and then discharged via a pipe 43. The other effluent gases are discharged from the gas separator 42 via pipe 44.

The fine particulate coke 46 resulting from the coal gasification or coking process in vessel 10 descends to the bottom of the vessel. It may be removed by a screw conveyor mechanism 47, or other conventional means, designed to remove fine particulate matter continuously, while maintaining the interior of the vessel 10 at the selected superatmospheric pressure.

The hydrogen discharged from gas separator 42 through pipe 43 may be delivered to suitable storage (not shown). Preferably, however, in accordance with this invention, the hydrogen is utilized immediately for the liquefaction of coal for the production of liquid coal derivatives. Thus, as illustrated in FIG. 1, the hydrogen gas discharged into pipe 43 passes through a flow regulator and compressor 49, thence through pipe 50 to an annular manifold 51 provided with a series of circularly spaced, inwardly extending nozzles 52 from which the hydrogen gas is discharged under high pressure directly into a coal liquefaction vessel 60.

Figure 3:
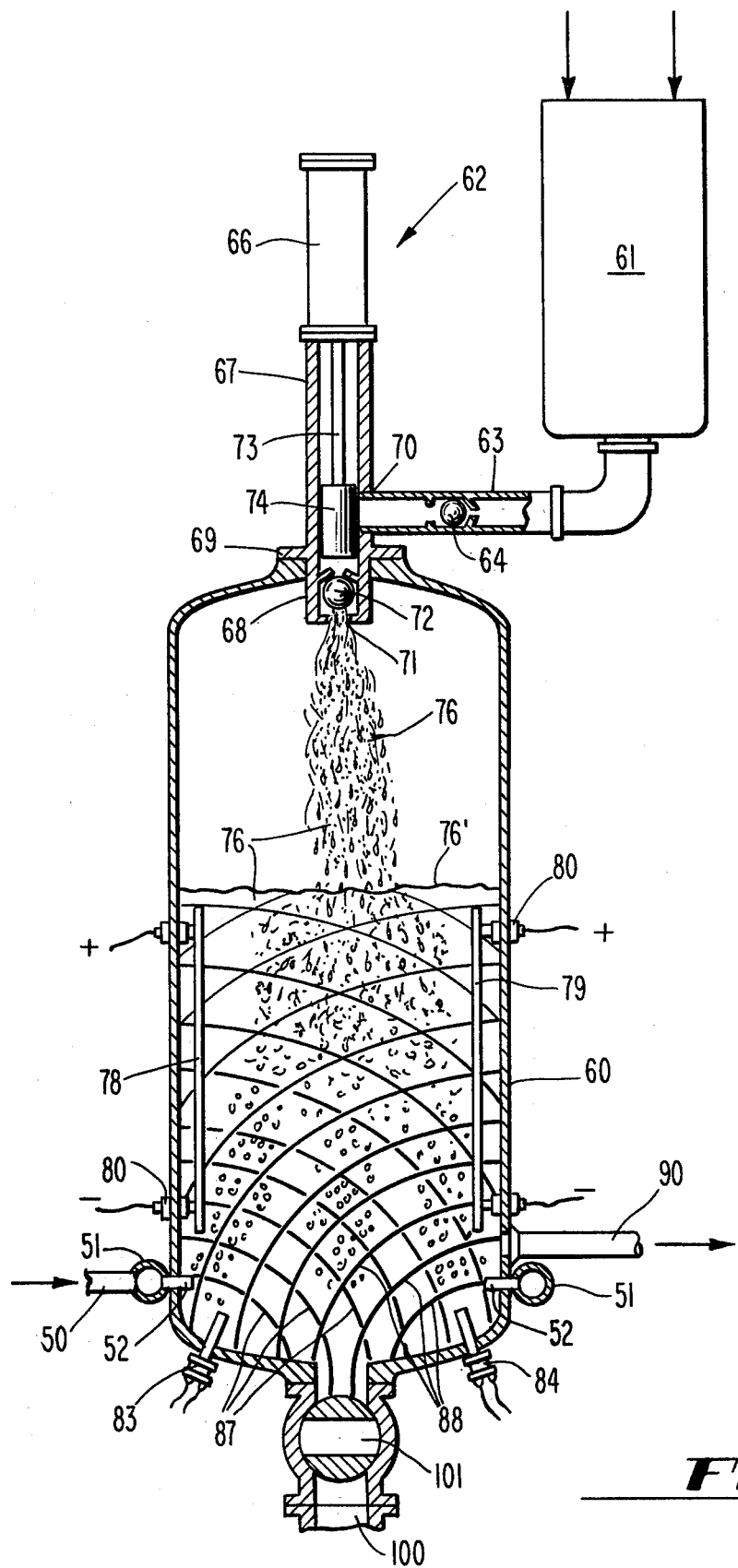
FIG. 3 is an enlarged view showing a preferred coal liquefaction apparatus utilized in my invention.

FIG. 3 illustrates in detail a preferred coal liquefaction apparatus which includes the closed, substantially oxygen-free pressure vessel or reactor 60, a slurry mixing tank 61, a slurry feeding device 62 and a slurry feed pipe 63, having a ball-type check valve 64 therein, connecting the bottom of slurry tank 61 to the slurry feeding means 62. The slurry feeding device or pump 62 includes a solenoid-controlled pneumatic or hydraulic cylinder 66 and a vertical downwardly extending hollow cylinder or conduit 67, the lower end 68 of which extends through the top of the vessel 60. The lower outer portion of cylinder 67 is provided with a flange 69 by which the cylinder may be secured, by any suitable securing means, in fluid tight relationship to the top of the vessel 60. The cylinder 67 is provided with a lateral opening 70 for the reception of the discharge end of the slurry pipe 63. The lower end 68 of the cylinder 67 is provided with a slurry discharge port 71, above which is disposed a ball-type valve 72. A vertically reciprocal rod 73 extends from the cylinder 66 downwardly within the hollow of the cylinder 67, and has a piston 74 affixed at its lower end. Piston 74 is slidably disposed in fluid tight relationship within cylinder 67.

Metered quantities of finely pulverized coal and of a hydrogenating liquid are introduced into slurry tank 61 and mixed therein to provide a slurry 76. The pulverized coal is reduced by conventional reducing mills to a particle size of approximately 200 microns or less. The hydrogenating fluid preferably is hydrophenanthrene, although other hydrogenating fluids such as tetralin or creosote oil may be utilized.

The feeding device 62 is operated to pump slurry from tank 61 into the vessel 60 at a selected or metered rate of slurry feed. More particularly, cylinder 66 is operative to retract rod 73 and piston 74 vertically upward, above the discharge end of slurry pipe 63, permitting slurry to flow from tank 61 via pipe 63 into the interior of the conduit 67. Cylinder 66 then causes rod 73 and piston 74 to advance downwardly to pump the slurry in cylinder 67 under fluid pressure past valve 72 and through port 71 into the vessel 60. The stream of slurry 76 descends downwardly within the vessel 60 and accumulates therein at a level 76' above the bottom of the vessel.

To heat the body of slurry 76 within the vessel 60, spaced electric heaters 78, 79 are mounted internally of the vessel and secured in spaced relation to its inner surface by suitable brackets 80. The heaters 78, 79 are connected by conventional electric circuitry to a suitable voltage source (not shown) located externally of the vessel 60. The level 76' of the slurry within the vessel 60 is maintained above the upper extremities of the heaters 78, 79. The interior of the vessel 60 is maintained under operating temperatures ranging from 350+ F. to 750° F., and superatmospheric pressure is maintained therein in the range of 750 to 2,000 psi. Optimum operating conditions may occur at approximately 750° F. at a pressure in excess of 1,500 psi.

The hydrogenating liquid in the slurry, as pointed out above, preferably may be hydrophenanthrene. When it or any substitute hydrogen containing liquid is subjected to high temperature and pressure, it releases its hydrogen content for combination with the carbon content in the pulverized coal. The reaction creates a liquid effluent which includes fractionable oil.

During the process, the hydrogen gas which is produced in the gasification vessel 10 is delivered continuously into the slurry 76 in the vessel 60 via compressor 49, pipe 50, manifold 51 and nozzles 52. The nozzles 52 are located adjacent the bottom of the vessel 60, to permit the hydrogen entering the vessel to pass upwardly through the slurry in the form of small bubbles. The hydrogen gas is delivered to the vessel 60 under a pressure slightly in excess of that maintained within the vessel. Because vessel 60 has been evacuated of air, to create an oxygen-free interior, an atmosphere of hydrogen is created within the upper portion of the vessel 60, above the level 76' of the slurry. The continuous introduction of hydrogen into the slurry 76, and the maintenance of an atmosphere of hydrogen above the slurry level 76', greatly increases the hydrogen available to combine with the carbon in the coal. This enables the production of liquid effluent which includes oil rich in hydrogen and capable of conversion into lighter fraction fuels, such as No. 2 heating oil and gasoline.

To maximize the utilization of the hydrogen available in the vessel 60, the heated slurry is insonated by high intensity ultrasonic shock waves generated by ultrasonic power transducers 83, 84. The transducers receive their power from an ultrasonic generator 85 (FIG. 1) disposed externally of vessel 60 and connected to the transducers by suitable circuitry. Ultrasonic shock waves 87, 88 are radiated by the transducers 83, 84 into the vessel 60, and penetrate entirely through the body of slurry 76 therein. The ultrasonic generator 85 is operated to cause the transducers 83, 84 to radiate shock waves into the slurry 76 at a frequency approximately matching the relaxation frequencies of the components of the liquid effluent being produced by the liquefaction process taking place within vessel 60. In preferred practice, the transducers 83, 84 are operated in the frequency range substantially equal to the relaxation frequencies of the materials upon which they are acting.

By thus insonating the heated slurry 76, the rate of liquefaction of the coal particles is greatly accelerated and the total yield of oil from the coal is significantly increased. This occurs because the insonation accelerates and intensifies the chemical reactions occurring during the liquefaction process, by compelling the addition of more hydrogen atoms to the oil molecules being created.

As is well known, the difference in chemical structure between coal and oil, and between oil and gasoline, is represented by the difference in their hydrogen content. The availability of increased hydrogen atoms to mix with the slurry, for addition to the oil molecules being created, combined with the insonation of the slurry, not only accelerates liquefaction and produces increased oil yields, but also results in lighter fractions, such as gasoline, in the oil component of the liquid effluent produced.

The above described chemical reaction within vessel 60 produces a liquid effluent in which the components are fractionable oil and hydrogenating fluid. Depending on the amount of hydrogen added, or made available to, the oil molecules derived from the liquefaction process, the lighter will be the available fractionable liquid fuels in the oil component of the effluent. The liquefaction process taking place within vessel 60 is carried out continuously, and the liquid effluent produced is removed continuously from vessel 60 through a pipe 90. The liquid effluent discharged through pipe 90 may be delivered to any suitable temporary storage (not shown), or to a centrifuge (not shown) where the oil component may be separated from the hydrophenanthrene by centrifugation. As illustrated in FIG. 1, the effluent may pass from vessel 60 through pipe 90 and flow central 91 to a still 92, where the hydrophenanthrene is separated from the oil. The separated hydrophenanthrene is discharged from the still through a pipe 93, while the oil component of the liquid effluent is fractionated in the still into liquid fuels, including gasoline, of differing boiling points and discharged through suitable multiple conduits 94 to storage.

If desired, part or all of the hydrogenating fluid produced as a by-product of the coal liquefaction process, and separated in the still 92, may be returned to the vessel 60 via pipe 95 having a flow controller 96 interposed therein. The hydrogenating fluid not returned to vessel 60 passes from pipe 93 through pipe 97 and valve 98 to storage.

During the liquefaction process in vessel 60, the residual solids, consisting mainly of pyrites, ash, etc., drop to the bottom, because of their higher specific gravities, and may be removed to a discharge line 100 via a gated valve 101.

While only two electric heaters 78, 79, and only two ultrasonic transducers 83, 84, are illustrated in FIG. 3, it will be understood that additional heaters and transducers may be utilized, as described or required. The location of the electric heaters 78, 79 and of the ultrasonic transducers 83, 84 relative to the interior of the vessel 60 is a matter of choice provided, of course, they are disposed so as to be submerged within the bath of slurry 76 to maximize heating and insonating of the slurry.

Figure 4:
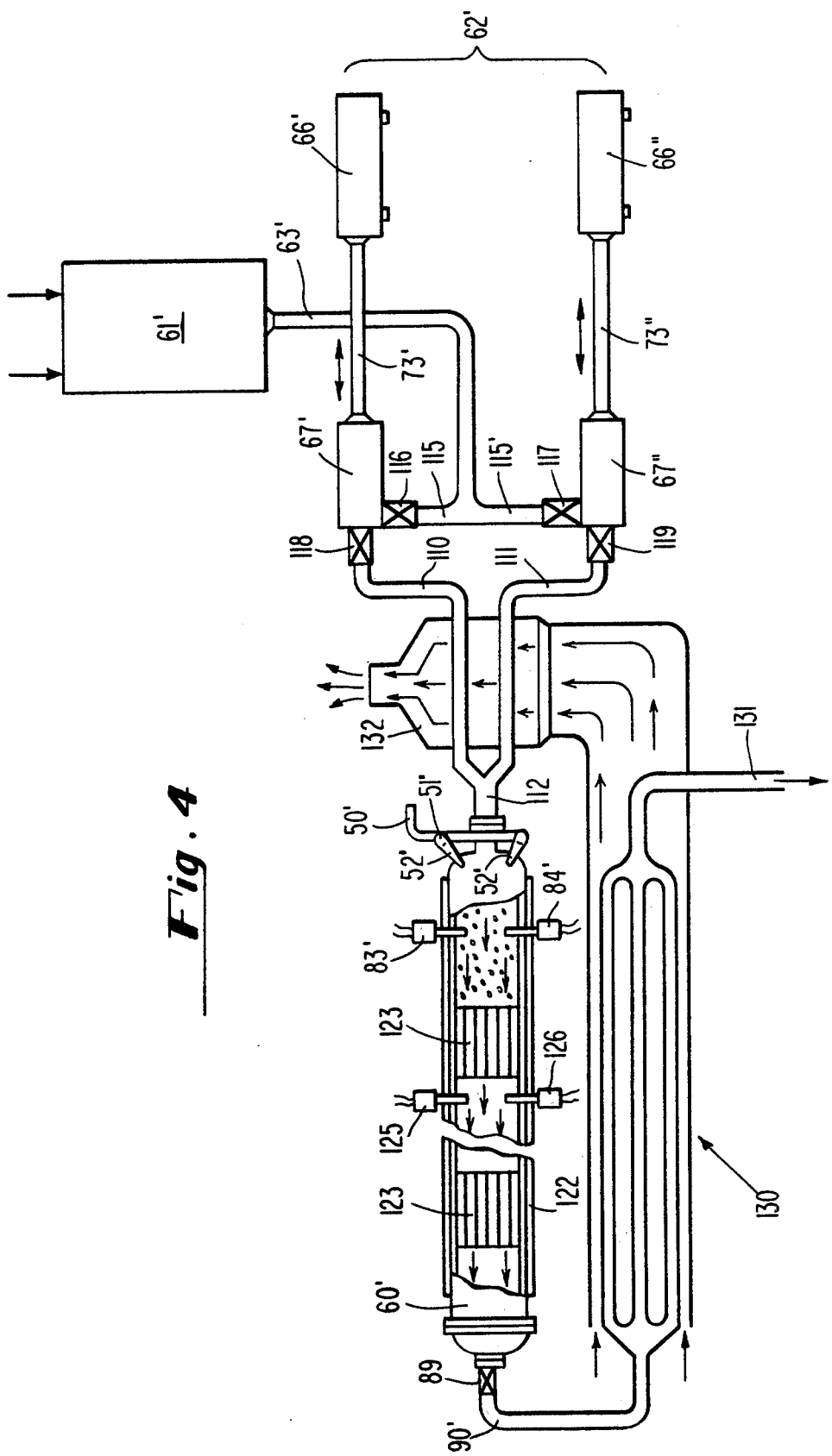
FIG. 4 shows a modified coal liquefaction apparatus utilized in my invention.

In the modified coal liquefaction apparatus illustrated in FIG. 4, the closed pressure vessel or reaction 60' is disposed horizontally, rather than vertically as illustrated in FIG. 3. The apparatus of FIG. 4 includes a slurry tank 61', slurry discharge pipe 63' and slurry feeding means 62' for continuously pumping slurry into the vessel 60'. The slurry feeding means 62' includes hydraulic cylinders 66', 66", reciprocal piston rods 73', 73", and pumps 67', 67", which are connected to vessel 60' via conduits 110, 111 and a Y conduit 112. Slurry pipe 63' is formed at its discharge end into a T connection, one branch 115 of which is connected to pump 67' through valve 116, and the other branch 115' of which is connected to pump 67" through valve 117. The pumps 67', 67" are connected, respectively, to conduits 110, 111 by valves 118, 119.

The pumps 67', 67" work in alternation to provide for the continuous pumping of slurry from tank 61' into vessel 60'. When cylinder 66' retracts its piston rod 73', valve 116 is opened automatically while valve 118 is closed automatically, whereby slurry is withdrawn from tank 61' via pipe 63', conduit 115 and valve 116 into pump 67'. At the same time, cylinder 66" advances its piston rod 73", whereby valve 117 is closed automatically, to shut off flow of slurry to pump 67", while valve 119 is opened automatically to permit the discharge of slurry from pump 67" through valve 119, conduit 111 and Y connection 112 into the vessel 60'. On the next pumping cycle the operations are reversed, whereby the advance of the piston rod 73' pumps slurry into vessel 60' via valve 118, conduit 110 and Y connection 112, while cylinder 66" retracts piston rod 73" to draw a fresh charge of slurry into the pump 67".

While slurry feeding means 62' is shown as including only two pumps 67', 67", and related slurry delivery systems, it will be understood that the slurry feeding device 62' may be composed of more than two such slurry pumping arrangements.

The pressure vessel 60' includes hydrogen gas injection means 50', 51', 52', ultrasonic transducers 83', 84' and effluent discharge pipe 90', which may have a discharge valve 89 interposed therein. The slurry in the vessel 60' may be heated by means of any conventional, external heating jacket 122.

Disposed within vessel 60', downstream from the transducers 83', 84', are catalyst beds 123. The catalyst may be in the form of small pellets, whose composition includes cobolt oxide, molybedenum trioxide, or other suitable catalytic compositions. The use of a catalyst further decreases the chemical reaction residence time for liquefaction of the coal particles, and further increases the yield of oil from the coal.

To further accelerate the liquefaction process within vessel 60', a second series of ultrasonic transducers 125, 126 may be provided, at a location intermediate of, or within the area of, the catalyst beds 123. The transducers 125, 126 are operated to emit shock waves into the slurry passing through the catalyst beds 123 at frequencies approximating the relaxation frequencies of the components in the slurry mixture. However, due to the upstream treatment of the slurry in the vessel 60', the relaxation frequencies of its components will have changed at the time of the flow of the slurry past the catalyst beds 123. Accordingly, the ultrasonic transducers 125, 126 will be operated at a frequency different from the frequency of the upstream transducers 83', 84'. In each instance, the transducers 83', 84' and 125, 126 will be operated to radiate ultrasonic shock waves into the flowing slurry at frequencies approximating the relaxation frequencies of the components of the slurry in the areas where the transducers are located.

The liquid effluent resulting from the liquefaction process taking place in vessel 60' may be directed to any suitable heat exchanger 130, for cooling the effluent prior to its discharge from the apparatus through pipe 131. The heated coolant flowing from the heat exchanger 130 may be discharged through a stack 132, through which the slurry feed conduits 110, 111 may pass. In this manner, the slurry fed from tank 61' into vessel 60' may be preheated, as it flows to the vessel, by the heated coolant discharged from the heat exchanger 130.

As the result of my invention described herein, it is possible to reduce the coal to oil conversion time to milliseconds, while greatly increasing the yield of oil per ton of coal, by maximizing the conversion of the carbon content in the coal into liquid effluent. Although preferred embodiments of this invention have been shown and described for the purpose of illustration, as required by Title 35 U.S.C. 112, it is to be understood that various changes and modifications may be made therein without departing from the spirit and utility of this invention, or the scope thereof as set forth in the appended claims.

I claim:

1. A process for converting coal into liquid coal derivatives, which includes continuously gasifying pulverized coal to provide hydrogen and separately and continuously liquefying pulverized coal to provide a liquid effluent containing fractionable oil and a hydrogenating liquid, including the steps of:
   a. providing a slurry composed of pulverized coal and a hydrogenating liquid,
   b. locating the slurry in a closed, substantially oxygen-free, pressure vessel,
   c. heating the slurry in the vessel,
   d. maintaining the slurry in the vessel at a selected elevated temperature and superatmospheric pressure,
   e. insonating the heated slurry by ultrasonic shock waves radiated into the vessel and
   f. introducing hydrogen produced by the gasification of the pulverized coal into the heated slurry during insolation of the heated slurry.

2. The process of claim 1, wherein the heated slurry is insonated by energy provided by ultrasonic power transducers.

3. The process of claim 1, wherein the heated and insonated slurry is exposed to a catalyst.

4. The process of claim 3, wherein the heated slurry is subjected to a second insonation while it is exposed to the coal liquefaction catalyst.

5. The process of claim 1, further including the step of providing pulverized coal substantially free of contaminants and pollutants and reduced below 100 microns in size for mixture with a hydrogenating liquid to form the slurry.

6. The process of claim 1, further including the step of centrifuging liquid effluent to separate the oil and hydrogenating liquid.

7. The process of claim 6, wherein at least a portion of the separated hydrogenating liquid is returned to the slurry in the vessel.

8. The process of claim 1, further including the step of delivering liquid effluent to a still to separate the oil from the hydrogenating liquid and to fractionate the oil into a plurality of liquid fuel fractions.

9. The process of claim 8, wherein selected metered quantities of the separated hydrogenated liquid are returned from the still to the slurry in the vessel.

10. The process of claim 1, wherein gasification of the pulverized coal comprises the following steps:
    a. providing pulverized coal substantially free of contaminants and pollutants and reduced below 100 microns in size,
    b. introducing the pulverized coal at a selected metered rate into a closed, substatially oxygen-free, pressure vessel,
    c. heating the coal particles by microwave energy as they enter the vessel,
    d. mixing the heated coal particles with superheated steam to convert the coal into combustible volatile gases, including hydrogen, and into finely divided coke, and
    e. separating the hydrogen.

11. The process of claim 10, further including the step of heating the coal particles to a temperature within the range of 1200° F. to 2000° F.

12. A process of liquefying coal comprising the steps of:
    a. providing finely pulverized coal particles substantially free of contaminants and pollutants,
    b. mixing the pulverized coal particles with a hydrogenating liquid to provide a slurry,
    c. locating the slurry in a closed, substantially oxygen-free, pressure vessel,
    d. heating the slurry in the vessel to hydrogenate the coal particles to produce liquid effluent composed of oil and a hydrogenating liquid,
    e. maintaining the slurry in the vessel at a selected elevated temperature and superatmospheric pressure,
    f. insonating the heated slurry by ultrasonic shock waves radiated into the pressure vessel
    g. and introducing hydrogen into the heated slurry in the vessel during insonation of the heated slurry.

13. The process of claim 12, wherein
    a. the vessel is maintained partially filled with slurry during liquefaction of the coal particles and
    b. an atmosphere of hydrogen is maintained in that portion of the vessel not occupied by the slurry.

14. The process of claim 12, further including the steps of:
    a. mixing the pulverized coal particles and the hydrogenating liquid externally of the pressure vessel to provide the slurry and
    b. introducing the slurry at a selected metered rate into the pressure vessel.

15. The process of claim 14, further including the steps of:
    a. continuously removing liquid effluent from the vessel and
    b. continuously maintaining the interior of the vessel under substantially constant superatmospheric pressure throughout the introduction of the slurry and hydrogen into the vessel and during removal of liquid effluent from the vessel.

16. The process of claim 12, wherein the interior of the vessel during hydrogenation of the coal particles is maintained continuously at a temperature of substantially 750° F. and under a superatmospheric pressure of at least 1,000 psi.

17. Apparatus for liquefying coal to provide liquid effluent composed of oil and a hydrogenating liquid comprising:
    a. a closed, substantially oxygen-free pressure vessel,
    b. a source of supply of pulverized coal particles,
    c. a source of supply of hydrogenating liquid,
    d. feeding means operably connected with said sources of supply for introducing metered quantities of pulverized coal and hydrogenating liquid into the vessel, to locate a slurry composed of the coal particles and hydrogenating liquid in the vessel,
    e. means for heating the slurry in the vessel,
    f. means for maintaining the slurry in the vessel at a selected elevated temperaure and superatmospheric pressure,
    g. means for insonating the heated slurry in the vessel by ultrasonic shock waves radiated into the vessel
    h. and means for introducing hydrogen into the slurry in the vessel during insonation of the heated slurry.

18. The apparatus of claim 17, wherein the insonating means comprises at least two ultrasonic power transducers operable to radiate the ultrasonic shock waves into the slurry in the pressure vessel.

19. The apparatus of claim 17, further including
    a. means for providing a slurry composed of pulverized coal particles and a hydrogenating liquid externally of the pressure vessel and
    b. slurry feeding means for introducing the slurry into the pressure vessel at a selected rate of feed.

20. The apparatus of claim 19, further including
    a. means for continuously removing liquid effluent from the vessel and
    b. means for removing residual solids from the vessel produced as a by-product of the liquefaction of the coal.

21. The apparatus of claim 20, further including means for maintaining the interior of the vessel under substantially constant superatmospheric pressure throughout the introduction of the slurry into the vessel and the removal of the liquid effluent and residual solids from the vessel.

22. The apparatus of claim 21, further including means for continuously introducing hydrogen into the vessel, while maintaining the interior of the vessel under substantially constant superatmospheric pressure.

23. The apparatus of claim 17, further including a catalyst in the vessel, and wherein the insonating means comprises spaced ultrasonic power transducer means, one of said transducer means being operable to radiate the ultrasonic shock waves into the slurry at a location remove from the catalyst and the other transducer means being operable to radiate the ultrasonic shock waves into the slurry proximate the catalyst.

24. The apparatus of claim 19, further including means for pre-heating the slurry as it is introduced into the pressure vessel.

25. The apparatus of claim 24, further including
    a. a heat exchanger for cooling effluent by a fluid coolant and
    b. means for exposing the slurry to the heated coolant to pre-heat the slurry prior to its introduction into the pressure vessel.

* * * * *